United States Patent [19]

Spencer et al.

[11] Patent Number: 5,035,145
[45] Date of Patent: Jul. 30, 1991

[54] DIFFERENTIAL MANOMETER PRESSURE GAGE

[75] Inventors: Richard H. Spencer; Edward S. Shanley, both of Winchester; Arthur A. Massucco, Natick, all of Mass.

[73] Assignee: Arthur D. Little, Inc., Cambridge, Mass.

[21] Appl. No.: 508,821

[22] Filed: Apr. 12, 1990

[51] Int. Cl.⁵ .............................................. G01L 7/16
[52] U.S. Cl. ..................................... 73/744; 116/272
[58] Field of Search ................ 73/747, 748, 749, 750, 73/744, 745, 746, 700; 116/266, 272, 70

[56] References Cited

U.S. PATENT DOCUMENTS

| | | | |
|---|---|---|---|
| 2,039,337 | 5/1936 | Nolan | 73/747 |
| 2,418,379 | 4/1947 | Wallace | 73/1 |
| 2,617,305 | 11/1952 | Dahm et al. | 73/384 |
| 2,733,601 | 2/1956 | Mitchell | 73/182 |
| 3,115,772 | 12/1963 | O'Keeffe et al. | 73/94 |
| 3,496,775 | 2/1970 | Sargent | 73/384 |
| 3,690,148 | 9/1972 | Snowdon | 73/37 |
| 3,965,734 | 6/1976 | Ward et al. | 73/141 A |
| 3,973,912 | 8/1976 | Trafton et al. | 23/230 B |
| 4,197,743 | 4/1980 | Dauphinee | 73/384 |
| 4,535,634 | 8/1985 | Troutman, Jr. et al. | 73/747 |

Primary Examiner—Donald O. Woodiel
Attorney, Agent, or Firm—Weingarten, Schurgin, Gagnebin & Hayes

[57] ABSTRACT

An improved closed-end manometer which overcomes the problems associated with prior U-tube manometer devices. The invention comprises a small bore tube which is transparent or translucent at least along the measuring portion and which may be of tapered or cylindrical bore, a permanent closure at one end of the tube, a relatively small indicating slug formed of a suitable liquid, a measuring scale to note the position of the liquid slug, and a measured quantity of a selected gas between the closure and the nearest end of the liquid slug. The open end of the tube is connected to the vessel or system whose pressure is to be measured or monitored. One feature of the present invention is its ability to provide quantitative pressure indications over a wide range of pressures, or the invention may be calibrated to provide increased sensitivity over a relatively short measuring range. Another feature of the invention is its ability to provide accurate pressure measurements regardless of the instrument's orientation. Furthermore, the invention may be readily formed in small sizes which renders it inexpensive to make and feasible for one-time, expendable use, for example with disposeable medical products.

18 Claims, 3 Drawing Sheets

DIFFERENTIAL MANOMETER PRESSURE GAGE

FIELD OF THE INVENTION

This invention relates to apparatus for measuring or monitoring pressure and more particularly to manometers.

BACKGROUND OF THE INVENTION

A manometer is a pressure-measuring instrument which is used to measure pressures either above or below atmospheric pressure. In either case the unknown pressure is estimated by noting the height of a liquid column that it will support. In its simplest form, the manometer consists of a U-tube as shown in FIG. 1, one end of which is open to the atmosphere, and the other end of which is coupled to the source of pressure to be measured. If the measured pressure is different from atmospheric pressure, the fluid with which the manometer tube is partially filled, usually mercury, will stand higher in one leg of the tube than the other.

There are several problems associated with the use of an open-end manometer. First, the manometer tube must provide at least 76 centimeters (39 inches) of displacement of mercury to support a pressure of one atmosphere. As a consequence, open-end manometers configured to measure even modest pressures are bulky devices. Furthermore, open-end manometers must remain stable and upright. If the manometer is rotated about its horizontal axis, or accidentally over-pressured, the manometer fluid will run out. This is especially undesirable when the fluid is mercury, which is toxic. Since scale calibration is also affected by angular orientation, it is generally the practice to mount U-tube manometers with the arms in a fixed position in order to prevent movement which would destroy the scale calibration. Therefore, open-end manometers are not readily adaptable to operate in various orientations and are practically limited to being used in a fixed location and position such as in a laboratory or shop.

A closed-end U-tube manometer is depicted in FIG. 2. This manometer is adaptable to a broader pressure range than open-end devices; however, as is the case with open-end manometers, closed-end manometers can lose their manometric fluid if rotated about a horizontal axis. Also, they are prone to loss of manometric fluid or loss of calibration if subjected to accidental pressure excursions. Furthermore, due to their relatively large size, and U-tube construction, it is essential that they remain stable and upright and therefore, they are essentially limited to stationary service.

The conventional mercury barometer is a special case of the straight tube, closed-end manometer. This device is useful only for indicating the pressure of the atmosphere at the open end of the tube, in absolute pressure units. The space between the end of the mercury column and the sealed end of the tube is evacuated and remains at zero pressure no matter what position the mercury column takes up.

It would be desirable, therefore, to have a manometer which is useful over a wide pressure range both above and below atmospheric pressure, and which is small in size, inexpensive enough to use on a one-time basis, and usable in any orientation.

SUMMARY OF THE INVENTION

The present invention provides an improved closed-end manometer which overcomes the problems associated with prior manometer devices. This invention comprises a small bore tube which is transparent or translucent at least along the measuring portion and which may be of tapered or cylindrical bore, a permanent closure at one end of the tube, a relatively small indicating slug formed of a suitable liquid, a measuring scale to note the position of the liquid slug, and a measured quantity of a selected gas between the closure and the nearest end of the liquid slug. The open end of the tube is connected to the vessel or system whose pressure is to be measured or monitored. The indicating portion of the tube may be straight or curved, for example to wrap around a cylindrical vessel.

One feature of the present invention is its ability to provide quantitative pressure indications over a wide range of pressures, both above and below atmospheric pressure. Furthermore, the pressure readings given by the present invention are essentially independent of the instrument's orientation, a circumstance that is attributable to the very small weight of the indicating slug.

Another feature of the present invention is its tolerance for any accidental pressure excursions that the manometer tubing can withstand. Over-pressure may drive the indicating slug toward the closed end of the manometer tube and off the scale without causing damage or loss of function.

Furthermore, the invention can provide intended sensitivity over a desired and relatively short measuring range, and can be readily formed in small sizes which renders it inexpensive to make and feasible for one-time, expendable use.

DESCRIPTION OF THE DRAWING

The invention will be more fully understood from the following solely exemplary detailed description taken in conjunction with the accompanying drawings in which.

DETAILED DESCRIPTION OF THE INVENTION

Figure 1:
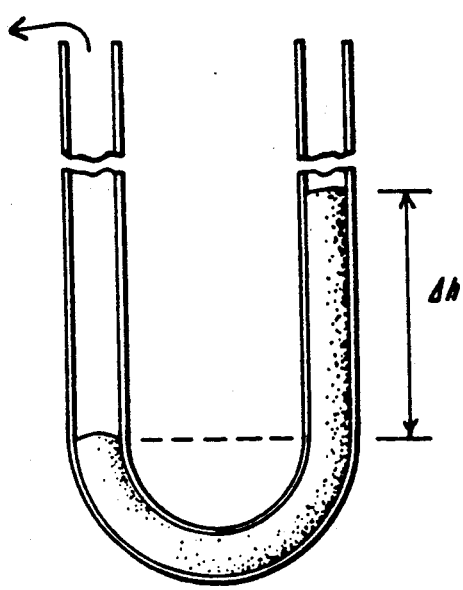
FIG. 1 is a diagram of a conventional, open-end, U-tube manometer.
Figure 2:
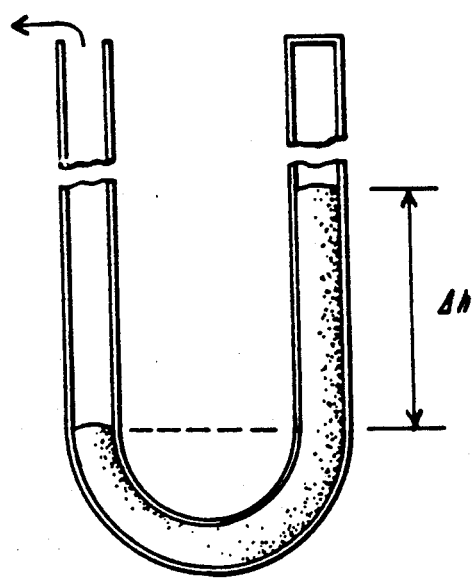
FIG. 2 is a diagram of a conventional, closed-end, U-tube manometer.
Figure 3:
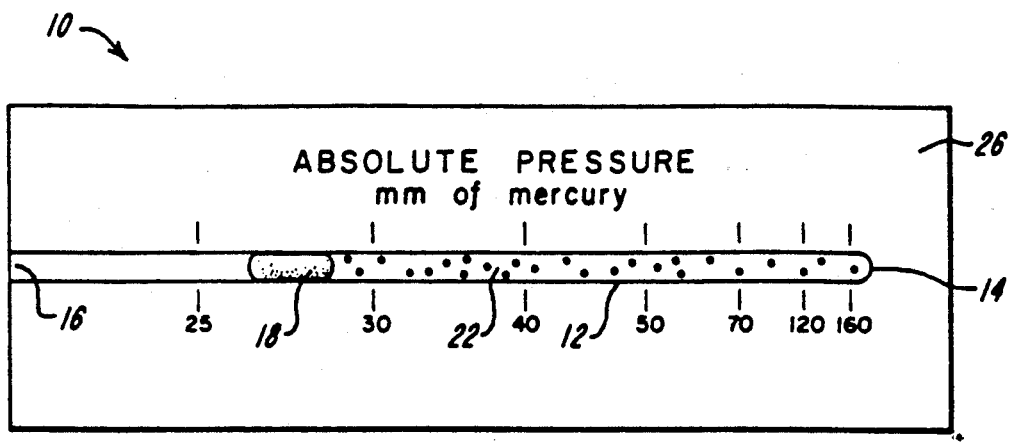
FIG. 3 is a diagram of the manometer of the present invention.
Figure 4:
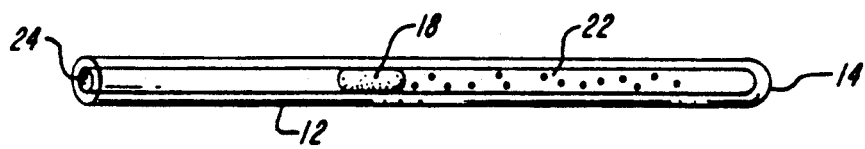
FIG. 4 is a perspective view of one embodiment of the manometer of the present invention.
Figure 5:
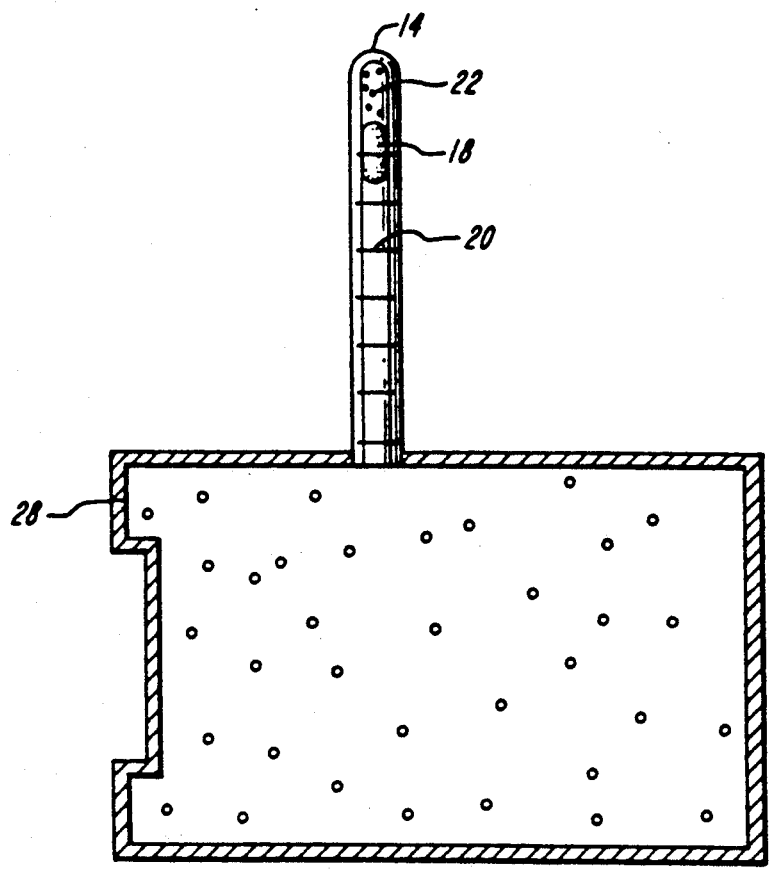
FIG. 5 is a plan view of the manometer of the present invention as it may appear in use coupled to a vessel.

Referring now to the drawings wherein the present invention is exemplarily illustrated in FIGS. 3–5, the manometer 10 includes a tube 12 with one closed end 14 and one open end 16, a liquid slug 18 within the tube, a scale 20 juxtaposed with the tube 12, and a preselected amount of gas, such as air, occupying the space 22 of the tube bore 24 between the closed end 14 and the liquid slug 18.

The tube 12 forming the body of the manometer 10 may be of any material that will withstand the pressure it will experience in service. The tube 12 must be transparent or translucent at least along the measuring portion. It must also be impermeable to the gas that will be trapped in the space 22 between the slug 18 and the closed end 14 of the tube 12. Suitable materials from which the tube 12 may be constructed include glass tubing, such as Pyrex and soda glass, and plastic coated glass tubing.

The bore 24 of the tube 12 may be of any convenient cross-sectional size that is not too large to prevent the formation and maintenance of a stable liquid slug 18 in any orientation the manometer 10 may be placed during use. In general, this requirement limits the tube bore 24 to a maximum of about 2 millimeters or 0.080 inch depending on the properties of the liquid slug 18. The bore 24 may be cylindrical or tapered as desired to optimize the relationship between pressure change and slug travel. For example, a tapered bore is useful when a linear scale is desired because a tapered bore may be chosen which corrects for the non-linear relationship between pressure and volume.

The indicating slug 18 is placed at a selected location between the closed end 14 and the open end 16 of the manometer tube 12. This location is determined by the desired sensitivity of the instrument. For high sensitivity (relatively large slug travel per unit of pressure change) the slug 18 may be placed at a considerable distance from the closed end 14 of the tube 12, thus leaving a larger volume of gas in the space 22 between the closed end 14 and the slug 18. It is recognized that for some limited applications, a bulb may be used at the closed end to give the effect of a longer tube. For situations where less sensitivity is required, the slug 18 may be placed at any convenient distance nearer to the closed end 14. Although there is no particular theoretical limit to the sensitivity that can be achieved, practical requirements limits the acceptable length of the tube 12. Furthermore, instruments incorporating large slug travel are limited in allowable rate of response to pressure changes, such that a tradeoff must be made between sensitivity and response time.

The liquid indicating slug 18 must form a gas-tight seal with the inner wall of the tube 12. The slug 18 must maintain its integrity regardless of tube orientation and in spite of pressure changes occasioned by rough handling. The indicating slug 18 must maintain its position and not run down the wall of the tube 12 when the tube is held in a vertical orientation for long periods and further, it must have a low vapor pressure so as to resist evaporation into the system 28 whose pressure is to be measured. Finally, the slug liquid should be environmentally benign, especially if the device is to be discarded after use. Various silicone fluids such as phenyl methyl siloxane, have been found suitable for use as the indicating slug 18 for the present invention. However, other low vapor pressure oils are within the scope of the present invention. Mercury is also acceptable for use as an indicating fluid when the device is to be reused or can be safely dismantled after use.

In one embodiment of the present invention, the slug 18 is injected into the tube 12 using a hypodermic syringe. The slug 18, most preferably, occupies a volume of the about 5 mm of the tube 12, however, longer or shorter slugs may be used.

The slug 18 is injected at a desired location within the bore 24 of the tube 12 leaving a preselected volume of gas in the space 22 between the closed end 14 of the tube 12 and the slug 18. For a tube of constant bore, the length of the space 22 between the closed end 14 and the slug 18 is a measure of the gas volume. The volume of preselected gas remaining in the space 22 is determined in accordance with the desired range of pressure to be measured as discussed above. It is preferable that the gas in the space 22 between the slug 18 and the closed end 14 be the same as the gas in the system 28.

In another embodiment of the present invention, the slug 18 is placed at the closed end 14 of the manometer tube 12 and a measured volume of gas is injected behind the slug 18.

The gas in the space 22 between the closed end 14 of the tube 12 and the liquid slug 18 obeys the gas law:

$$PV = nRT$$

Where P is the pressure of the gas, V is the volume of gas, n is a constant, R is a constant and T is temperature. If the manometer 10 of the present invention is used at or near ordinary, ambient temperature, it is acceptable to assume that PV is constant.

Because the liquid slug 18 exhibits zero static friction, the pressure will always be the same on each side of the slug 18 within the tube 12, and the same as that in the system 28 to which the manometer 10 is connected. The volume in the space 22 between the closed end 14 and the slug 18, and therefore, the position of the slug, will respond to changes in the pressure in the system. The relation will be as follows:

$$P_1/P_2 = V_1/V_2$$

where $P_1$ and $P_2$ refer to pressure changes in the system 28 to be measured, while $V_1$ and $V_2$ refer to changes in the volume of the space 22 between the closed end 14 and the slug 18 at the respective pressures. As the volume in the space 22 between the closed end 14 and the slug 18 is directly proportional to the dimension "l" (length of the space 22 between the closed end 14 and the slug 18), the above equation may be modified as follows:

$$P_1/P_2 = l_2/l_1$$

Figure 6:
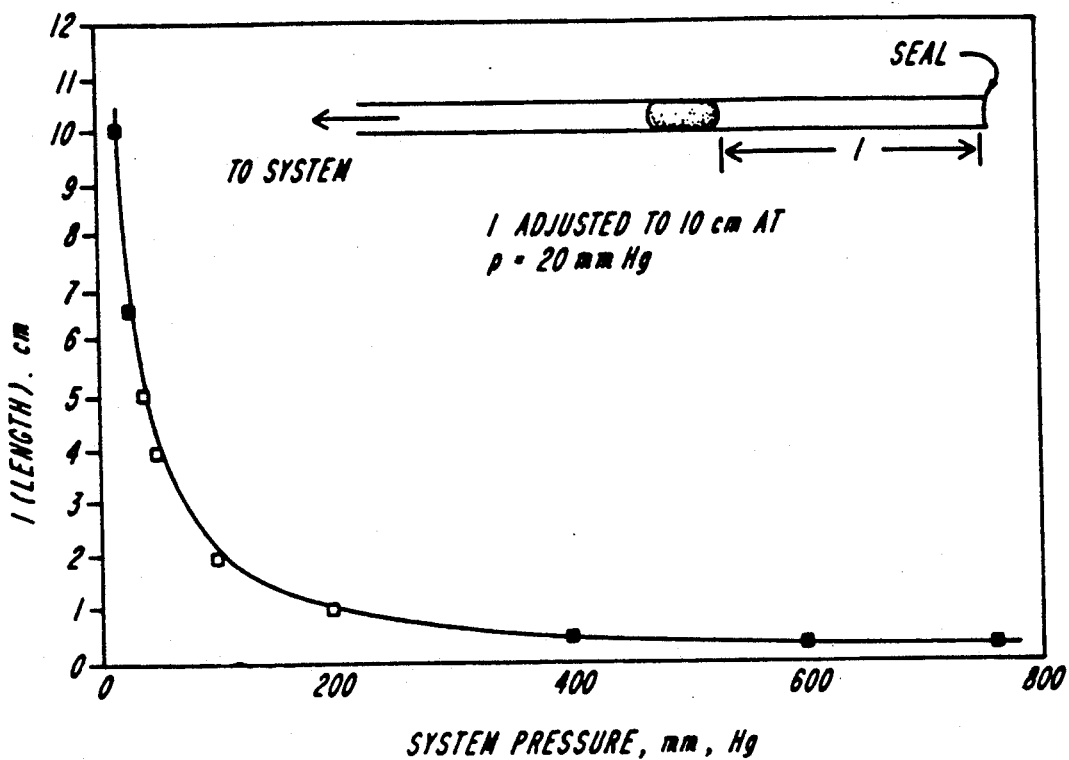
FIG. 6 is a graph of system pressure versus l(length), length of the slug in the manometer tube.
Figure 7:
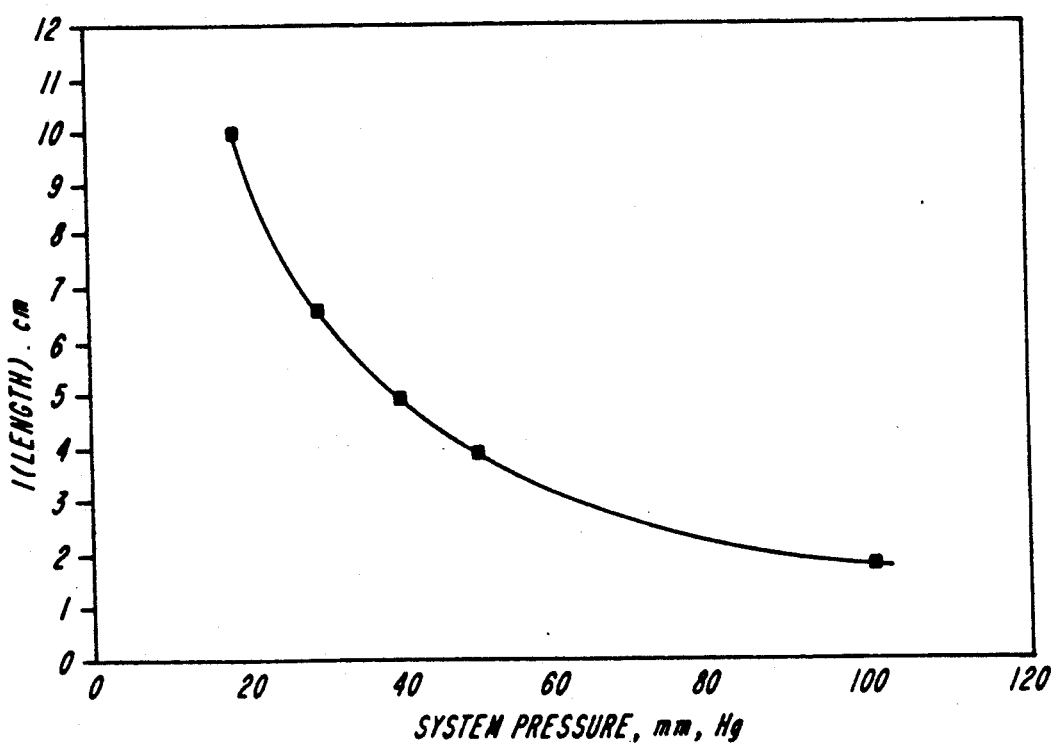
FIG. 7 is an expanded scale graph of system pressure versus l(length), the length of the slug in the manometer tube.

Thus, the volume of gas required for $V_1$ to give the required l(length) travel in the tube at $V_2$ can be readily calculated since the volume (V) and length (l) of a cylinder is related by $$V = \pi r^2 l$$

where r = radius of the tube bore. By using this formula any working pressure, or vacuum range can be preselected. Table 1 contains calculated values for one manometer configuration where l(length) has been set at 10 cm at an absolute pressure of 20 mm Hg. FIGS. 6 and 7 show the same data in graphical form. Similar tables and pressures can be generated for intended pressures to be monitored as described above.

TABLE 1

CALCULATED VALUES OF PRESSURE VERSUS DISPLACEMENT FOR A MANOMETER HAVING A CALIBRATION PRESSURE SET POINT OF 20 mm Hg AT 10 cm

| Absolute Pressure | |
|---|---|
| mm Hg | l (length) (cm) |
| 20 | 10.00 |
| 30 | 6.67 |
| 40 | 5.00 |
| 50 | 4.00 |
| 100 | 2.00 |
| 200 | 1.00 |

TABLE 1-continued

CALCULATED VALUES OF PRESSURE VERSUS DISPLACEMENT FOR A MANOMETER HAVING A CALIBRATION PRESSURE SET POINT OF 20 mm Hg AT 10 cm

| Absolute Pressure | |
|---|---|
| mm Hg | l (length) (cm) |
| 400 | 0.50 |
| 600 | 0.33 |
| 760 | 0.26 |

The response curve of the manometer 10 is suitable for monitoring pressure around any selected calibration pressure set point. Sensitivity is very high in the pressure region near the calibration pressure set point, but much lower at higher pressures where the scale begins to compress. The reverse is true if the manometer is used in a vacuum mode since the sensitivity increases as $V_2$ increases relative to $V_1$. The indicating slug 18 will continue to respond to pressure changes over the whole pressure range but with reduced sensitivity for pressures greater than the set point.

The scale 20 of the instrument may be etched, engraved or otherwise marked on the tube 12, or may be carried on any suitable backplate 26 attached to the tube. This scale 20 can be defined by adjusting the pressures at the open end 16 of the tube by any suitable means and then marking appropriate points on the tube 12 or backplate 26. In the case when the bore 24 is cylindrical, the scale 20 deflection at any pressure can be calculated from the equation described above. If the tube 12 is tapered, the scale 20 can have other forms, for example, a nearly linear form over any limited pressure range.

EXAMPLE

A manometer of the present invention was prepared in the following manner:

Twenty centimeter long Pyrex tubing having 3 mm OD, standard 0.6 mm wall thickness, and 1.7 mm ID was cleaned with warm water and a 5% Alconox solution. The tubing was then rinsed with distilled water. The cleaned tubing was then drawn full of fluorocarbon treating solution which is a 1% solution of perfluoroalkytriethoxysilane in Freon 113 manufactured by PCR, Inc., Gainsville, Fla. The fluorochemical imparts the necessary surface properties to the Pyrex tubing to provide sufficient interfacial tension between the liquid slug and the glass and to maintain a stable liquid slug column. The treated tubing was then sealed off with a torch to form the body of the manometer with one closed end. Because the fluorocarbon coating is damaged in the region of the seal, these tubes are refilled with fluorocarbon treating solution, and allowed to stand before being drained and oven cured at 100° C. for about three minutes.

The slug liquid was prepared using Dow Corning Silicone Fluid 710, a polymeric phenylmethylsiloxane, and pylam oil-soluble yellow, a fluorescent dye. The dye darkened the color of the slug liquid and made it more visible. Since the manometer was to be attached to a vacuum vessel, it was necessary to degas the slug liquid because silicone liquids contain a large amount of dissolved air at atmospheric pressure.

The manometer was assembled by drawing the degassed slug liquid into a capillary tube using a hypodermic syringe and then injecting the slug liquid into the treated tube nearest the closed end leaving a small amount of space between the closed end and the facing end of the liquid slug. The slug column occupied about 5 mm of the tube. The open end of the tube was attached to a vacuum pump and pumped down to the desired calibration pressure of about 25 mm Hg absolute. The position of the slug at calibration pressure and atmospheric pressure were marked on the manometer tube and were the basis for determining the scale.

For circumstances that require a remote readout, electronic readouts may be used. Examples are optical sensing of the slug position and capacitive sensing of the slug position.

The invention is not to be limited by what has been particularly shown and described, except as indicated by the appended claims.

What is claimed is:

1. A manometer comprising:
a tube having at least a portion which is transparent or translucent;
said tube having a bore therein, a closed end, and an open end for coupling to a source of pressure to be measured;
said bore having a small diameter capable of maintaining a stable liquid slug within said bore throughout all orientations of the manometer;
a liquid slug within said bore; and
a preselected amount of gas within said bore between said liquid slug and said closed end.

2. The manometer of claim 1 wherein said liquid slug is environmentally compatible.

3. The manometer of claim 2 wherein said liquid slug is a low vapor pressure oil.

4. The manometer of claim 3 wherein said low vapor pressure oil is a silicone oil.

5. The manometer of claim 4 wherein said low vapor pressure oil further comprises a chemical dye.

6. The manometer of claim 1 wherein said liquid slug forms a gas-tight seal with the inner wall of the tube.

7. The manometer of claim 6 wherein said liquid slug maintains its integrity and substantially maintains its position in the tube bore for any tube orientation.

8. The manometer of claim 1 wherein said liquid slug is mercury.

9. The manometer of claim 1 further comprising a scale for indicating pressure.

10. The manometer of claim 1 wherein said tube is comprised of a transparent material.

11. The manometer of claim 10 wherein said tube is comprised of glass.

12. The manometer of claim 11 wherein said glass tube is pretreated with a chemical prior to introduction of the liquid slug into the bore.

13. The manometer of claim 10 wherein said tube is comprised of a plastic material.

14. The manometer of claim 10 wherein said tube is comprised of a plastic material laminated to glass.

15. The manometer of claim 1 wherein said bore is of uniform cylindrical shape throughout the length of the tube.

16. The manometer of claim 1 wherein said bore varies in crossection along the length of the tube.

17. The manometer of claim 1 wherein the bore has a maximum size of about 2 millimeters.

18. The manometer of claim 1 wherein the bore is of a size to maintain the liquid slug at an intended position in the bore for any tube orientation.

* * * * *